United States Patent
Hergeth

(10) Patent No.: US 11,587,335 B2
(45) Date of Patent: Feb. 21, 2023

(54) METHOD FOR INFLUENCING SYSTEMS FOR MONITORING ALERTNESS

(71) Applicant: Bayerische Motoren Werke Aktiengesellschaft, Munich (DE)

(72) Inventor: Sebastian Hergeth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/049,278

(22) PCT Filed: Jun. 13, 2019

(86) PCT No.: PCT/EP2019/065491
§ 371 (c)(1),
(2) Date: Oct. 20, 2020

(87) PCT Pub. No.: WO2019/238820
PCT Pub. Date: Dec. 19, 2019

(65) Prior Publication Data
US 2021/0256279 A1    Aug. 19, 2021

(30) Foreign Application Priority Data

Jun. 13, 2018  (DE) ............... 10 2018 209 440.3

(51) Int. Cl.
*G06V 20/59* (2022.01)
*G06V 40/16* (2022.01)
*G06V 40/18* (2022.01)

(52) U.S. Cl.
CPC .......... *G06V 20/597* (2022.01); *G06V 40/171* (2022.01); *G06V 40/193* (2022.01)

(58) Field of Classification Search
CPC ........... G06K 9/00845; G06K 9/00281; G06K 9/0061; G06V 20/597; G06V 40/171; G06V 40/193; G08B 21/06; G08B 21/0476

See application file for complete search history.

(56) References Cited

U.S. PATENT DOCUMENTS

| | | | | |
|---|---|---|---|---|
| 6,927,694 | B1 * | 8/2005 | Smith | B60K 28/066 340/576 |
| 7,692,551 | B2 * | 4/2010 | Bonefas | G06T 7/0004 340/576 |

(Continued)

FOREIGN PATENT DOCUMENTS

| | | |
|---|---|---|
| DE | 10 2010 050 843 A1 | 5/2012 |
| DE | 10 2011 011 221 A1 | 7/2012 |
| DE | 10 2016 011 246 A1 | 4/2017 |

OTHER PUBLICATIONS

PCT/EP2019/065491, International Search Report dated Aug. 2, 2019 (Three (3) pages).

(Continued)

*Primary Examiner* — Md K Talukder
(74) *Attorney, Agent, or Firm* — Crowell & Moring LLP

(57) ABSTRACT

A method for influencing a system for monitoring alertness of an operator when operating a device includes providing one or more representations of features of the operator in a detection region of the system, where each of the one or more representations reproduces at least one feature of the operator and where the influencing is based on the detection of the one or more representations by the system.

10 Claims, 2 Drawing Sheets

(56) References Cited

U.S. PATENT DOCUMENTS

| | | | | |
|---|---|---|---|---|
| 2007/0014431 | A1* | 1/2007 | Hammoud | G06V 40/19 382/104 |
| 2008/0068187 | A1* | 3/2008 | Bonefas | G06T 7/0004 340/575 |
| 2010/0245093 | A1* | 9/2010 | Kobetski | H04N 7/18 340/576 |
| 2014/0139655 | A1* | 5/2014 | Mimar | G08B 21/0476 340/575 |
| 2014/0152792 | A1* | 6/2014 | Krueger | A61B 5/4863 348/78 |
| 2017/0364070 | A1* | 12/2017 | Oba | B60K 28/066 |
| 2018/0025240 | A1* | 1/2018 | Klement | G06F 3/012 348/47 |
| 2019/0156134 | A1* | 5/2019 | Krishnan | G06V 20/59 |
| 2019/0265699 | A1* | 8/2019 | Yabuuchi | A61B 5/6893 |
| 2019/0375428 | A1* | 12/2019 | Aoi | B60W 60/0053 |
| 2020/0207358 | A1* | 7/2020 | Katz | G01C 21/3697 |

OTHER PUBLICATIONS

German Search Report issued in German application No. 10 2018 209 440.3 dated Feb. 5, 2019, with Statement of Relevancy (Seven (7) pages).

Anonymous, "Amazon.com: Tinksky 2 pcs Halloween Trick Toy male Female Funny Eyes Glasses Prank Disguise Eyeglass Party Props: Gateway", Jan. 7, 2018, URL: https//www.amazon.com/Tinksky-Hallnween-Glasses-Disguise-Eyeglass/dp/B074H5NC16 ,5 Total pages, XP055609338.

* cited by examiner

METHOD FOR INFLUENCING SYSTEMS FOR MONITORING ALERTNESS

BACKGROUND AND SUMMARY OF THE INVENTION

The invention relates to methods for influencing systems for monitoring alertness.

When automated or partially automated vehicles or vehicle systems are used it is usually necessary, if the vehicle is not fully automated (e.g., is a SAE level 5 or partially level 4 vehicle), to ensure that a human driver is sufficiently alert to take over control of the autonomously driving vehicle within a predefined time period. In this context, various systems are used for monitoring alertness, which systems detect the driver's alertness using various technologies and trigger a warning signal or initiate other measures if the driver is inadvertently not alert or has an increasingly poor level of alertness.

Current SAE level 2 assistance systems often monitor, for example, the driver's alertness with respect to the driving task by means of hands-on detection, i.e., by detecting contact of the hands with the steering wheel, e.g., by means of capacitive sensors in the steering wheel rim or torque measurement on the steering column. On the basis of image capture by means of cameras directed toward the passenger compartment it will in the future be possible to analyze reliable and valid viewing movement and alertness, in order to ensure that the driver remains alert and/or looks at the road. In this context, camera systems can be used which are operated in the visible and/or infrared spectrum.

Factors such as fatigue or the execution of activities which usually involve distraction from the events on the road can be detected by evaluating the viewing behavior. In this context, for example the viewing direction or the duration or frequency of blinking of the eyes is detected. When the driver is insufficiently alert or behaves incorrectly in some other way, his/her alertness can firstly be directed, using warning signals, onto the relevant surroundings or the traffic or, if the driver fails to react, the system for the autonomous operation of the vehicle can be curtailed or switched off and, if appropriate, an emergency stopping maneuver or the like can be initiated.

U.S. Pat. No. 6,927,694 describes visual methods and systems for determining the alertness and wakefulness of persons under conditions of exhaustion, lack of sleep and the effect of consciousness-altering substances such as alcohol and drugs, in particular under specific conditions for truck drivers, bus drivers, train operators, pilots, watercraft controllers and operators of heavy stationary equipment under day conditions or night conditions. The described methods and systems reliably track the features of a person's head and face with a single on-board camera with a fully automatic system which can be initialized automatically. The system can be newly initialized if required and make outputs in real time. The system can also classify the rotation in all the viewing directions, can detect "eye occlusion/mouth occlusion" and can detect "blinking of the eyes". In this context, visual and acoustic alarms can be triggered for the driver. The described methods and systems are clearly not aimed at detecting continuous failure of eyelid movements (e.g., blinking) to occur, but are instead concentrated on detecting relatively longer occlusions (i.e., that the eyelids are closed).

US 2014/0139655 A1 relates to a vehicle telematics device for avoiding accidents on the basis of monitoring of the driver with respect to sleepiness and distraction. Distraction and sleepiness are detected by processing information relating to the driver's face and posture in accordance with the speed and the maximum permitted travel distance, and a driver alarm is triggered when drowsiness or distraction is detected. The measures which are triggered in response comprise acoustic alarms as well as other methods such as adaptation of the lighting system in order to wake up the driver. The described device is clearly also not aimed at detecting continuous failure of movements of the eyelids (e.g., blinking) to occur.

US 2007/014431 A provides a system and a method for detecting one eye or both eyes of the driver of a vehicle. The system contains a video camera which is oriented so as to generate images of the driver's face. The system also contains a video processor for processing the images generated with the video imaging camera. Filters are applied to each of the potential candidates for eyes in order to determine which candidates represent an eye, and weighted values are assigned to the filtered candidates for eyes, and an eye is detected on the basis of the weighting of each candidate for an eye. According to one aspect, patches of different sizes of potential candidates for eyes are processed and compared with models.

A known warning system for detecting driving without wearing a seatbelt can, as is known, be bypassed or deactivated, for example, by means of dummy plugs for seatbelt locks. Devices which simulate the presence of at least one hand in order to bypass or deactivate a warning system on the basis of hands-on detection are also known for detecting the hands on the steering wheel.

The presence of such systems is an indication of the emergence of systems for bypassing the abovementioned safety systems. The reasons for such a development could include that drivers of a (partially) autonomous vehicle look for ways of carrying out other activities while driving (e.g., writing SMS messages, reading, sleeping) instead of fulfilling their obligation to be alert.

The outstanding reliability of autonomous vehicles means that, within the foreseeable future, the acceptance of excessively strict monitoring mechanisms on the part of the users of a vehicle is and will be low. Therefore, there is a need for methods for influencing the monitoring systems, such as those above, or of changing their trigger thresholds so that other activities can at least be temporarily performed while the autonomous vehicle is being used. In this context it would be desirable to provide a flexible method which does not engage permanently in the systems present in the vehicle but rather constitutes a simple temporarily applicable solution.

An object of the present disclosure is to provide a method for influencing systems for monitoring alertness, which method avoids the abovementioned disadvantages and/or implements the abovementioned advantages.

According to embodiments of the present disclosure, a method for influencing a system for monitoring the alertness of an operator during the operation of a device is specified. The method comprises providing one or more representations of features, preferably of facial features, of a human person in a detection range of the system, wherein each of the one or more representations represents at least one feature of the operator, and wherein the influencing is based on the detection of the one or more representations by the system. In particular, the influencing is based on the detection of the one or more representations and their assignment to an operator or to the operator by the system.

At least one of the one or more representations preferably forms at least one feature of the operator in such a way that the system assigns the one or more representations to the operator. Alternatively or additionally, at least one of the one or more representations forms at least one feature of the operator in such a way that the system assigns a detected state on the basis of the one or more representations of the operator assigned to the operator, wherein the detected state corresponds to a predetermined state which is required by the system for continued operation of the device.

The one or more representations preferably include elements which can be detected optically in a spectrum of visible light. Alternatively or additionally, the one or more representations include elements which can be detected optically in the infrared spectrum.

At least one first of the one or more representations preferably relates to a person's eyes. The one or more representations are also preferably arranged on a carrier structure which is similar to a pair of glasses and which can be worn by the operator.

The at least one first of the one or more representations, which relates to a person's eyes, represents, for each represented eye, one or more of the following primary elements: pupil, iris and sclera, wherein preferably all the above-mentioned elements are represented. The at least one first of the one or more representations, which relate to a person's eyes, preferably also additionally represents, for each represented eye, one or more of the following secondary elements: upper lid, lower lid, eyelashes and eyebrows.

One or more of the primary and/or secondary elements of each of the at least one first of the one or more representations is/are preferably configured in such a way that an active or passive movement of the one or more of the primary and/or secondary elements is made possible.

At least one second of the one or more representations preferably relate to a person's mouth, wherein the at least one second of the one or more representations which relates to a person's mouth represents one or more of the following elements: upper lid and lower lid, wherein also all the above-mentioned elements are preferably represented.

The device preferably includes a vehicle, preferably a motor vehicle, wherein the vehicle also preferably includes a passenger car, truck or a motorcycle.

The device preferably includes the system for monitoring the alertness of an operator. Alternatively or additionally, the system comprises at least one camera which is arranged so as to detect the detection range, preferably wherein the detection range of the camera comprises an interior space of the device. Alternatively or additionally, the detection range is selected in such a way as to detect an area in which the operator regularly stops to operate the device.

The described method relates generally to any devices which can include a monitoring system as described above, i.e., in principle any technical device which can be operated in a partially automated or automated fashion while a human operator is ready to assume control as a fallback option. However, in particular, the present invention relates to partially autonomous or autonomous road motor vehicles, in particular passenger cars, trucks, buses or motorcycles. The vehicle can comprise a drive motor or engine (in particular an electric drive motor) for driving one or more wheels of the vehicle.

It is to be noted that the methods, devices and systems described in this document can be used alone as well as in combination with other methods, devices and systems described in this document. Furthermore, any aspects of the methods, devices and systems described in this document can be combined with one another in a variety of ways. In particular, the features of the claims can be combined with one another in a variety of ways.

In the text which follows, the invention will be described in more detail with reference to exemplary embodiments.

DETAILED DESCRIPTION OF THE DRAWINGS

Figure 1:
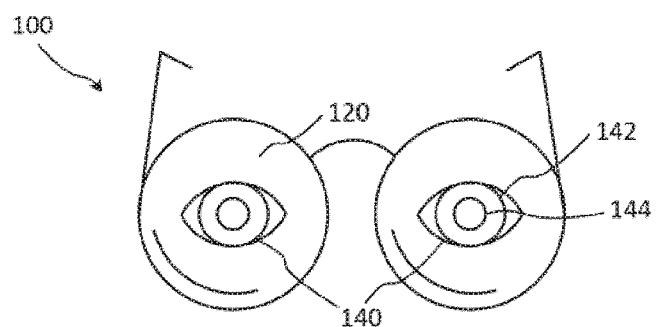
FIG. 1 shows by way of example a first representation of facial features of an operator, which representation can be used in the method according to the invention.

The invention generally relates to a method for using one or more representations 100 of features, preferably facial features, of an operator 160. The features can include, for example, the eyes 140, head 162, nose 164 and/or mouth 166 of a human person, but are not restricted to these. The representations of, for example, the eyes 140 are to be understood as symbolic here. According to the invention it is not necessary to represent the eyes 140 of the operator 160 but rather only the eyes 140 of any human person. The detection of the monitoring systems described above is not personalized or individualized, the aim is merely to perform generic detection of facial features and not to assign specific features in a personalized way to a specific operator.

In one example, the one or more representations 100 include a pair of glasses or a head covering with "artificial eyes" or pupil-like objects 140, which are applied in a visible fashion and/or in a fashion that is visible in the infrared spectrum. The (representations of the) eyes 140 can be applied, on the one hand, in a visible fashion on the lenses 120 of the glasses so that light in the visible range of the spectrum is reflected as a result of the fact that the eyes can be detected by an image capturing system (e.g., a camera) In this context, the eyes 140 are preferably applied in such a way that the view through the glasses is not significantly adversely affected (e.g., essentially transparent or semi-transparently from the inside). Alternatively, the frame of the glasses and/or the eyes is/are configured in such a way that the user is provided with an unobstructed view past the applied eyes (e.g., below, above or to the side of them). A corresponding head covering is similarly constructed and can have, for example, eyes which are applied to a sunshade or visual protection which is mounted in front.

The representations of the eyes or at least parts thereof (e.g., pupil and/or iris or the entire eye) are preferably mounted so as to be movable in at least two axes so that a natural or naturally appearing movement thereof is made possible. In this context, the eyes or parts thereof can be either movable according to a random or predefined pattern and/or can remain oriented or centered with a predefined fixed point by means of a sensor system. In this context, this can have the objective of representing a viewing behavior which is as natural as possible, and/or the representation of the viewing behavior of a driver who is paying attention to the road in front of him.

A possible technical implementation comprises here both the actuator system by means of electrical and/or electromechanical components and/or electromagnetic excitation and/or an approaching movement by means of an inertia mechanism using the naturally occurring movement of the driver's head as an excitation sensor.

FIG. 1 illustrates by way of example a first representation 100 of features 140, 162, 164, 166, preferably facial features, of an operator 160, which representation 100 can be used in the method according to the invention. The first representation 100 comprises a frame in the manner of a pair of glasses, which can be worn by a user like a pair of glasses. Representations of eyes 140 of a human person, which can be perceived in the visible spectrum of light, are respectively applied to the lenses 120 of the glasses. The representations of the eyes 140 are, as described above, preferably configured in such a way that the person wearing the glasses, e.g., the user of a vehicle, has an essentially unimpeded view through the glasses (e.g., through the use of essentially transparent material, for example transparent or semitransparent film).

Figure 2:
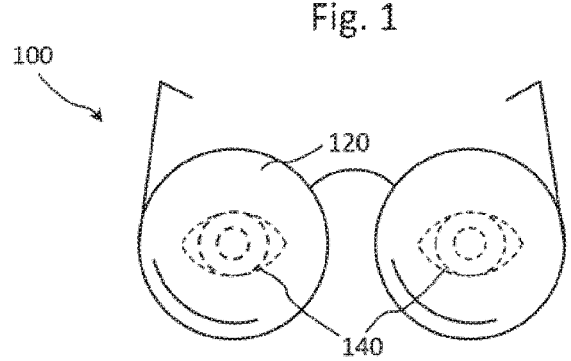
FIG. 2 shows by way of example a second representation of facial features of an operator, which representation can be used in the method according to the invention.

FIG. 2 illustrates by way of example a second representation 100 of facial features 140, 162, 164, 166 of an operator 160, which presentation 100 can be used in the method according to the invention. The second representation 100 in FIG. 2 corresponds largely to the first representation 100 from FIG. 1, wherein the representations of the eyes 140 in the case of the second representation 100 essentially reflect light in the infrared spectrum so that the representation of the eyes 140 can be detected by image capturing systems (e.g., cameras) outside the visible spectrum of light. It is expressly provided that the representation of the eyes 140 is configured in such a way that visible light and infrared light are reflected at the same time. This can have the result that the representation 100 can be detected by a plurality of different alertness monitoring systems.

By carrying the representation 100 according to FIG. 1 or 2, an alertness monitoring system which is potentially present in the vehicle detects primarily or exclusively the representations of the eyes 140, which representations simulate a continuous or controlled view to the monitoring system. As a result, the genuine viewing behavior of the user or wearer e.g., averting of the eyes, closing of the eyes) can no longer be detected by the monitoring system. Instead, the acquired image data relating to the representations of the eyes is evaluated. According to the invention, for this evaluation, there is no triggering of an alertness alarm.

The one or more representations 100 can also be provided by virtue of the fact that a user applies an essentially opaque or transparent carrier for the representations of the eyes 140 (e.g., a sticker) to an existing conventional pair of glasses.

Figure 3:
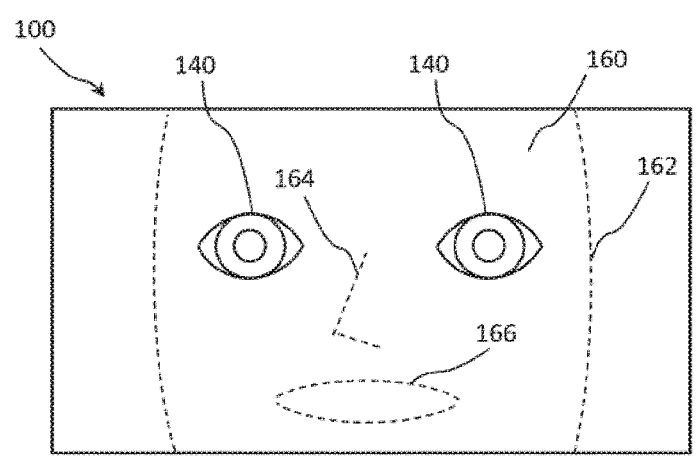
FIG. 3 shows by way of example a third representation of facial features of an operator, which representation can be used in the method according to the invention.

FIG. 3 illustrates by way of example a third representation 100 of facial features 140, 162, 164, 166 of an operator 160, which can be used in the method according to the invention. The third representation 100 includes a pictorial representation of eyes 140 of a human person. The third representation 100 can include alternative or additional facial features, for example a silhouette of the head 162 of a person, their mouth 166 and/or nose 164. The third representation 100 in FIG. 3 is provided to be made available via a user in the detection range 240 of a monitoring system in such a way that instead of the actual facial features of the user (i.e., of the operator 160) the monitoring system detects and evaluates representations 100 of the facial feature or features.

This can be brought about by the user, for example, by applying the representation 100 in the detection range, for example in the imaging range of a lens of a camera 220 of the monitoring system 200, in a removable or permanent fashion. The third representation 100 can comprise, for example, an image as illustrated in FIG. 3. Alternatively, or additionally, the representation 100 can comprise one or more (three-dimensional) representations of figures, heads, imitations of eyes or the like. As a result, the genuine viewing behavior of the user or wearer (e.g., averting of the eyes, closing of the eyes) can no longer be detected by the monitoring system. Instead, the acquired image data relating to the representations of the eyes are evaluated. According to the invention, for this evaluation, there is no triggering of an alertness alarm.

Figure 4:
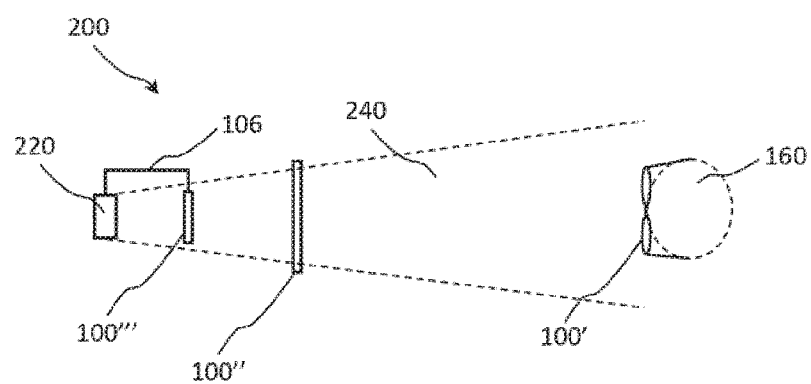
FIG. 4 shows a plurality of application examples of the abovementioned representations, which examples illustrate the effect of the method according to the invention in a detection range of a camera.

FIG. 4 illustrates a plurality of application examples of the abovementioned representations 100 which illustrate the effect of the method according to the invention in a detection range 240 of a camera 220. A monitoring system 200 generally comprises a camera 220 which is arranged to detect one or more features, preferably facial features of an operator 160 in a detection range 240. In a corresponding control unit (not shown), which can also be integrated into the camera 220 or into control units which are present at the vehicle end, or can be implemented externally to the vehicle, the acquired image data is then evaluated and, if appropriate, an alertness alarm or other measures triggered (see above). The evaluation of the image data usually comprises detecting the eyes of an operator 160 and, in particular, a viewing direction and/or closing of the eyes over a recorded time period. For example, relatively long periods in which the eyes are detected as being closed, or as disproportionately frequent blinking or as blinking which is detected over a long time, can then bring about the triggering of alertness alarms or of other measures.

As described above, a user or an operator 160 can put on a representation 100 which is similar to a pair of glasses (cf position 100'; use of the first and/or second representations 100 from FIGS. 1 and 2), The representations of the eyes 140 of a human person, which are made available directly in front of the operator's eyes, are then primarily or exclusively detected by the system 200, wherein the state of the representations of the eyes 140, which can be continuously detected as opened, and/or the eyes' detectable viewing direction can be associated with an alert operator 160 who is looking at the road, and an alarm or other measures do not occur. The representations of the eyes 140 for the system can preferably be detected both in the visible spectrum of light as well as in the infrared spectrum of light.

Alternatively or additionally, the user of the vehicle can arrange one of the representations 100, which are described in relation to FIG. 3, in the detection range 240, preferably in a removable or temporary fashion cf. positions 100" and 100'" in FIG. 4), optionally by means of a securing device 106, so that the same effect occurs. The representations of the eyes 140, and if appropriate of further facial features (e.g., 162, 164, 166) of a human person, which are made available this time directly in front of the operator's face, are then again detected primarily or exclusively by the system 200. The state of the representations of the eyes 140, which can be continuously detected as opened, and/or their detectable viewing direction can also be associated with an alert operator 160 who is looking at the road, in this case, and an alarm or other measures do not occur. In this application, the representations of the eyes 140 for the system can preferably also be detected both in the visible spectrum of light as well as in the infrared spectrum of light.

The representations of the eyes or at least parts thereof (e.g., pupil and/or iris or the entire eye) are preferably mounted so as to be movable in at least two axes, so that a natural or naturally appearing movement thereof is made possible. In this context, the eyes or parts thereof can be either movable according to a random or predefined pattern, and/or can remain oriented or centered with a predefined fixed point by means of a sensor system. In this context, this can have the objective of representing a viewing behavior which is as natural as possible, and/or the representation of the viewing behavior of a driver who is paying attention to the road in front of him. For example, by using a forward-directed camera (e.g., integrated into the frame of the glasses and/or a camera which is present in the vehicle) a viewing direction which is supposedly "correct" or "alert" can be determined, wherein the moving parts of the representations 100 are then actuated by means of a suitable actuator system in such a way that this viewing direction which is determined as "correct" or "alert" is essentially maintained or simulated. As a result, even relatively large movements of the head, when the operator 160, for example, turns away from the viewing direction in the direction of travel for a relatively long time, are also preferably compensated.

A possible technical implementation comprises here both the actuator system by means of electrical and/or electro-mechanical components and/or electromagnetic excitation and/or an approaching movement by means of an inertia mechanism using the naturally occurring movement of the driver's head as an excitation sensor. These possibilities for actuation relate expressly to all the described variants of the representations 100 (cf. FIGS. 1 to 3) and are not limited to individual embodiments and/or applications. In applications in which no representation 100 worn by the operator on the body (e.g., a pair of glasses) is used, the actuator system can also be configured in such a way as to generate periodic movements of the representation 100 and/or of parts of the representations of the facial features 140, 162, 164, 166, in order to counteract detection of a static state. Therefore, for example an operator 160 who is continuously detected as being static or nonmoving can be classified by the system 200 as being unconscious or adversely affected in some other way, possibly on the basis of the representation 100 made available in the detection range 240, and a corresponding alarm and/or further measures can be triggered. The objective of the actuator system is to minimize or rule out such states which can be detected as static.

Furthermore, in similar embodiments or applications it is possible to provide temporary or continuous use of the representations 100.

The present invention is not limited to the exemplary embodiments shown. In particular it is to be noted that the description and the Figures are intended to illustrate only the principle of the proposed methods, devices and systems.

LIST OF REFERENCE CHARACTERS

100 Representation(s) of features of an operator
100', 100", 100''' Exemplary positions of representation(s) of features of an operator
106 Securing device
120 Lens of pair of glasses
140 Representation(s) of an operator's eyes
142 Representation of the iris of an eye
144 Representation of the pupil of an eye
160 Operator
162 An operator's head
164 An operator's nose
166 An operator's mouth
200 System for monitoring alertness
220 Camera
240 Detection range

What is claimed is:

1. A method for influencing a system that monitors alertness of an operator when operating a device, comprising the steps of:
    arranging a representation of a facial feature of a human person by the operator in a detection range of a camera of the system, wherein the representation represents a feature of the operator, wherein the representation is symbolic of the feature of the operator, and thus, is a generic representation of the feature that is not personalized to the operator, and wherein the representation of the facial feature represents a viewing behavior of a driver that is paying attention to a road that is in front of the driver;
    detecting the arranged representation of the facial feature of the human person by the camera of the system;
    evaluating the detected arranged representation of the facial feature of the human person by the system and not evaluating an actual facial feature of the operator by the system; and
    influencing the system based on the evaluating to result in no triggering of an alertness alarm.

2. The method as claimed in claim 1, wherein the representation represents the feature of the operator such that the system assigns the representation to the operator and/or wherein the representation represents the feature of the operator such that the system assigns a detected state to the operator, wherein the detected state corresponds to a predetermined state which is required by the system for continued operation of the device.

3. The method as claimed in claim 1, wherein the representation contains an element which is detectable optically in a spectrum of visible light and/or is detectable optically in an infrared spectrum.

4. The method as claimed in claim 1, wherein the facial feature is an eye and wherein the representation is disposed on an eyeglass structure which is worn by the operator.

5. The method as claimed in claim 4, wherein the eye includes one or more primary elements and wherein the primary elements include a pupil, an iris, and a sclera.

6. The method as claimed in claim 5, wherein the eye includes one or more secondary elements and wherein the secondary elements include an upper lid, a lower lid, eyelashes, and an eyebrow.

7. The method as claimed in claim 6, wherein the primary elements and/or the secondary elements are actively or passively moveable.

8. The method as claimed in claim 1, wherein the facial feature is a mouth which includes one or more of an upper lip and a lower lip.

9. The method as claimed in claim 1, wherein the device is a motor vehicle and wherein the motor vehicle is a passenger car, a truck, or a motorcycle.

10. The method as claimed in claim 1, wherein:
    the device includes the system;
    wherein the detection range comprises an interior space of the device; and
    the detection range is selected so as to detect an area in which the operator stops regularly in order to operate the device.

* * * * *